Patented Dec. 23, 1952

2,623,061

UNITED STATES PATENT OFFICE 2,623,061

PROCESS FOR REACTING AMMONIA AND OLEFINS

John W. Teter and Leonard E. Olson, Chicago, Ill., assignors to Sinclair Refining Company, New York, N. Y., a corporation of Maine No Drawing. Application February 11, 1949, Serial No. 75,976

3 Claims. (Cl. 260—465.3)

This invention relates to improvements in the production of nitrogen-containing products, particularly nitriles, by the direct catalytic reaction of olefins with ammonia. It includes improvements in the process and particularly comprehends an improved type catalyst which is characterized by high relative activity and catalyst life.

The production of nitrogen-containing products, particularly nitriles, by direct reaction of ammonia with olefins requires relatively high temperatures; e. g. ranging from about 400° F. to about 725° F., elevated pressure; e. g. upwards of 500 p. s. i., and the use of a catalyst which selectively promotes amination in an environment of competing reactions such as hydrogenation, dehydrogenation, cracking, and polymerization. The nature of the catalyst is critical, and cobalt containing catalysts although very costly have been found to be most satisfactory from the standpoint of activity, product distribution, and catalyst life. Our application Serial No. 694,434 filed August 31, 1946, now Patent No. 2,520,181, describes certain reduced metal oxide catalysts in which a part of the costly cobalt is replaced by another metal which is capable as an oxide of forming a spinel-type crystal structure with cobalt oxide. These catalysts are much more economical than the standard type cobalt catalysts, and have relatively high activities.

We have now discovered that a catalyst representing the reduction product of mixed cobalt and magnesium oxides supported on a diatomaceous earth carrier possesses peculiarly advantageous properties in selectively promoting the direct reaction of olefins and ammonia. The new type catalyst contains from about 5 to 40 weight per cent of magnesium, up to about 50 weight per cent of cobalt, and upwards of 10 weight per cent of the carrier. Actually the catalysts are not in the metallic state, but the probable composition after activation is perhaps a mixture of cobalt, cobalt as cobalt oxide, magnesium oxide and silica. This application is a continuation-in-part of our before-described application Serial No. 694,434, now Patent No. 2,520,181.

The new type catalyst may be conveniently prepared, for example, by coprecipitation of the basic carbonates of cobalt and magnesium from a solution of the sulfates of those metals. The precipitant, for example, soda ash, is conveniently applied in solution with which the supporting material, for example, celite, a commercially available diatomaceous earth, is slurried prior to admixture of the hot solutions. We have found that such a catalyst containing, for example, 26.5% by weight of cobalt, 23% of magnesium, and 23.9% of celite has a relative activity of 35 weight per cent nitrile yield compared to 28% shown by a standard cobalt on celite catalyst tested under comparable conditions. In addition, we have found that the useful life of the new catalyst is markedly superior to that of the standard catalyst. For example, in a comparison test in which the standard catalyst and the before-described new catalyst were held for 30 days at the standard processing temperature of 700° F. and were then re-tested for activity, the activity of the standard catalyst declined from an initial activity of 27 to an activity of 18, whereas the new catalyst fell off only slightly, from 35 to 33.

We have found that the molar proportion of cobalt to magnesium, calculated as metal, may vary between approximately 1:2 and 1:8 without serious effect on cobalt efficiency; that is the relationship of yield to weight per cent cobalt. We have found, however, that approximately 10% of celite or a similar diatomaceous type material is necessary for superior activity on both a yield basis and a catalyst life basis. We have found that catalysts containing approximately 25 to 35 weight per cent of cobalt, approximately 5 to 40 weight per cent of magnesium, and say 10 to 25 weight per cent diatomaceous earth are particularly advantageous with respect to catalyst activity and life.

The new catalysts are advantageously prepared in the form of small agglomerates or granules, as by pelleting or extrusion, after deposition of the active ingredients on the inert carrier, and in the process, will advantageously be used in the form of a fixed bed, with the mixture containing the ammonia and olefin being passed through the bed.

The new catalysts are capable of reactivation by hydrogen after having been onstream for a period of time sufficient to cause the catalyst to lose some of its initial activity, and may be used with advantage in the cyclic process described in Teter Patent 2,419,470 issued April 22, 1947, in which two or more reactors are used in parallel, with one reactor onstream while the other is being reactivated by passing hydrogen through it followed by an ammonia purge. However, we have found that the burden of reactivation is considerably reduced because of the improved life of the new type catalyst. In general, in using the new catalyst, it is advantageous to use a large excess of ammonia in the process, as described in Teter Patent 2,417,892 issued March 25, 1947, and a relatively high space velocity; e. g. about 0.5 liquid volume of olefin per volume of catalyst per hour.

The new type catalyst is prepared by depositing the catalytic metal on the inert carrier, for example, as the hydroxide or carbonate, calcining the resulting material to convert the metal to the oxide or mixture of oxides, and then reducing the resulting metal oxide with hydrogen. The exact structure of the resulting reduced metal mixture is not known. That is, it is not known whether in the active catalyst, the metal is present as such, or whether part of it is present as such, with the remainder present as an oxide, or mixture of oxides, or whether the effective catalytic material represents some equilibrium mixture of metal, and one or more metal oxides. The reduced metal catalyst is pyrophoric, and ferromagnetic, and there are indications that it does contain definite proportions of both metal and metal oxide, and it may be that the active catalyst is metal activated by metal oxide, or the active material may be an intermediate oxide.

In the prepartion of the catalyst, cobalt sulfate, and the sulfate or other soluble salt of magnesium, will ordinarily be used because of cost, but in general, the nature of the salts selected is not of great significance. After the cobalt and magnesium are deposited on the carrier in the form of the hydroxide or carbonate, the product is washed with demineralized water to remove soluble salts, and in particular, to remove sulfate and chloride ions. In general, in the new catalysts, it is desirable to keep the sulfate content below about 0.2%, and the chloride content below about 0.1%. Sodium, in small quantities, however may be an activator or promoter, so that the same care in its removal is usually unnecessary. The product is finally calcined, pelleted, and reduced. Ordinarily, final reduction will be carried out in the reactor, although it is possible to reduce the catalyst in another vessel, and then stabilize it in the known way for transportation. A typical preparation and certain of the principles of our invention will be illustrated by the following examples.

*Example I*

A suspension of 540 grams of diatomaceous earth (Celite #337) is slurried for 10 minutes in 1.5 gallons of a hot (90° C. approximately) solution of soda ash containing 1270 grams of anhydrous sodium carbonate (Na₂Co₃). One gallon of a hot solution containing 895 grams of cobalt sulfate heptahydrate (CoSO₄·7H₂O) and 1370 grams of magnesium acetate tetrahydrate (Mg(OAC)₂·4H₂O) corresponding to a cobalt to magnesium mole ratio of 1:2 is then added over a half hour period. The slurry is allowed to cool while stirring for an additional half hour, and the precipitate filtered off and dried at 110° C. for 12–16 hours. The dried precipitate is then broken up and washed with hot water by a series of successive slurrying and filtering procedures until the sulfate analysis on the cake drops to 0.10% on an ignited basis. The catalyst cake is then redried at 110° C. ground to pass 20 mesh and calcined for 2 hours at 340° C. Ordinarily, 30 minutes is allowed in addition for the material to come up to temperature. The calcined material is mixed with 4% graphite and pelleted. The catalyst is then introduced into a reactor and reduced as with hydrogen at 3,000 space velocity and atmospheric pressure for 5 hours, followed by an ammonia purge at processing temperature and pressure.

The catalyst so prepared was then used in the production of nitrogen-containing products from a mixture of ammonia and hydrocarbon, the hydrocarbon being a typical PP fraction containing 37% of propylene with the remainder largely propane, with some ethane, ethylene, and higher hydrocarbons. The molar ratio of ammonia to olefin in the feed was 10:1. The olefin space velocity was 1.0 volume per volume of catalyst per hour. The temperature was 700° F., the pressure 1,500 p. s. i., and the runs were conducted in a cyclic manner over a 1-hour period. The yield of nitrogen-containing products was 23% (average of 3 runs) with a product distribution, relatively high in the desirable propionitrile as follows: acetonitrile 25.2 weight per cent, propionitrile 44.5, isobutyronitrile 4.4, n-butyronitrile 17.9, and water and bottoms 0.8 and 7.2, respectively.

Under comparable test conditions a standard cobalt on celite catalyst containing approximately 39% cobalt gave an average weight per cent yield over 3 tests of 28%. Thus the Co:2MgO catalyst containing only 47.5% as much cobalt gave 82% yield of the standard catalyst. Obviously, this represents a very significant advantage from the cost standpoint since cobalt is by far the most expensive ingredient in these catalysts. From the standpoint of equivalent cobalt content the catalyst of the example had a relative activity of 170% compared to the standard catalyst.

*Example II*

A catalyst having an increased cobalt and magnesium content, but in which the same Co:MgO ratio was retained, was then prepared in an analogous manner. The catalyst contained 26.5 weight per cent cobalt, 23% magnesium, and 23.9% celite. The activity under similar test conditions was found to be 35 weight per cent yield of nitrile. Thus this catalyst has an activity of 125% compared to the standard catalyst 100%, and on the basis of equivalent cobalt content had a relative activity of 175%. When tested for catalyst life by holding for 30 days at 700° F., the activity of the catalyst dropped only to 33 whereas the standard catalyst declined from 27 to 18.

Further catalyst studies on our new type catalysts establish that the activity in terms of weight per cent yield of catalyst increases with increasing weight per cent of cobalt up to an activity of about 35% to 40% at upwards of 25 to about 35 weight per cent cobalt, reaching a maximum percentage yield in the approximate region of 35%. These catalysts are all superior to the standard cobalt-celite catalyst in terms of efficiency of cobalt utilization; that is with respect to the relationship between yield and weight per cent cobalt with the superiority most marked over the approximate range of 20 to 50 weight per cent cobalt. The activities of the standard cobalt-celite catalyst do not increase quite as rapidly with increasing weight per cent cobalt, with lower activity values obtained for each equivalent weight per cent cobalt and the activity reaches a maximum obtainable value at a lower figure. Thus, activities higher than about 30% are not feasible with standard cobalt catalysts as these catalysts reach an optimum concentration of cobalt at about 40 weight per cent cobalt and activities fall off rapidly as higher concentrations of cobalt are used.

Other examples of useful catalysts that we have prepared are, by way of illustration: 4Co:Mg on 25% celite which displayed an activity of 31%, Co:8Mg on 15% celite which displayed an activity of 21%, Co:2Mg on 10% celite which displayed an activity of 36 weight per cent nitrile produced. These catalysts are characterized by a high efficiency of cobalt utilization combined with long catalyst life. With respect to maximum utilization of reactor volume, however, we consider that catalysts containing approximately 25 to 35 weight per cent cobalt are especially advantageous.

By contrast, a catalyst prepared without a diatomaceous earth support, containing 43.0% cobalt and 26.6 weight per cent magnesium showed an initial activity of only 21.1% despite the high cobalt content. Even more significantly, however, the activity dropped to less than 7% after one test and a standard reactivation in the second hour of testing. Accordingly, we consider that the presence of celite or a similar type support is required for good activity and catalyst life. Typical data on the aforesaid illustrative catalyst preparations and test runs are summarized in the following table:

| Approximate Catalyst Composition | Wt. Percent Co | Wt. Percent Mg | Wt. Percent Celite | Activity, Wt. Percent Yields [1] |
|---|---|---|---|---|
| Co:2Mg—40 celite | 18.5 | 14.9 | 43.7 | 23 |
| Co:2Mg—25 celite | 26.5 | 23.0 | 23.9 | 35 |
| Co:2Mg—no celite | 43.0 | 26.6 | none | [2] 21 |
| 4Co:Mg—25% celite | 48.1 | 4.8 | 23.5 | 31 |
| Co:8Mg—15% celite | 13.7 | 39.1 | 16.6 | 21 |
| Co:2Mg—10% celite | 33.4 | 28.1 | 8.3 | 36 |
| Co—40% celite | 38.8 | none | 42.1 | 28 |

[1] Test conditions: 700° F.; 1,500 p. s. i.; 10:1/NH₃:C₃=mole ratio; 60 minute test period; 1.0 liquid v./v./hr. olefin space velocity. 37% propylene=in hydrocarbon.
[2] On further testing activity fell off rapidly.

Hence, this invention provides an improved process for producing valuable nitrogen-containing products directly from olefins and ammonia which utilizes improved mixed cobalt-magnesium oxide supported catalysts. The catalysts provide high product yields, being particularly characterized by improvement in cobalt utilization, and are marked by greatly improved stability and useful life.

We claim:

1. In a process for producing nitrogen-containing products from ammonia and olefins, the improvement which comprises reacting a mixture containing ammonia and an olefin, the ammonia being present in substantial excess, in contact with a catalyst consisting of the reduction product of mixed cobalt and magnesium oxides supported on a diatomaceous earth carrier, in which the molar proportion of cobalt to magnesium is within the approximate range of 1:2 and 1:8, the proportion of cobalt approximates 13.7 to 35 weight per cent, the proportion of magnesium is less than 40 weight per cent and the carrier content is at least about 10 weight per cent, while maintaining a reaction temperature within the range from about 400° to about 725° F. and a pressure above about 500 pounds per square inch.

2. In a process for producing nitrogen-containing products from ammonia and olefins, the improvement which comprises reacting a mixture containing ammonia and an olefin, the ammonia being present in substantial excess, in contact with a catalyst consisting of the reduction product of mixed cobalt and magnesium oxides supported on a diatomaceous earth carrier, in which the molar proportion of cobalt to magnesium is within the approximate range of 1:2 to 1:8, the proportion of cobalt approximates 20 to 35 weight per cent, the proportion of magnesium is less than 40 weight per cent and the proportion of carrier is at least about 10 weight per cent, while maintaining a reaction temperature within the range from about 400° to about 725° F. and a pressure above about 500 pounds per square inch.

3. In a process for producing nitrogen-containing products from ammonia and olefins, the improvement which comprises reacting a mixture containing ammonia and an olefin, the ammonia being present in substantial excess, in contact with a catalyst consisting of the reduction product of mixed cobalt and magnesium oxides supported on a diatomaceous earth carrier, in which the molar proportion of cobalt to magnesium is within the approximate range of 1:2 to 1:8, the proportion of cobalt approximates 25 to 35 weight per cent, the proportion of magnesium is less than 40 weight per cent and the proportion of carrier is at least about 10 weight per cent, while maintaining a reaction temperature within the range from about 400° to about 725° F. and a pressure above about 500 pounds per square inch.

JOHN W. TETER.
LEONARD E. OLSON.

REFERENCES CITED

The following references are of record in the file of this patent:

UNITED STATES PATENTS

| Number | Name | Date |
|---|---|---|
| 2,381,470 | Teter | Aug. 7, 1945 |
| 2,381,473 | Teter | Aug. 7, 1945 |
| 2,381,709 | Apgar et al. | Aug. 7, 1945 |
| 2,417,892 | Teter | Mar. 25, 1947 |
| 2,418,562 | Teter | Apr. 8, 1947 |
| 2,429,855 | Teter | Oct. 28, 1947 |
| 2,467,407 | Ruthruff | Apr. 19, 1949 |
| 2,468,522 | Teter | Apr. 26, 1949 |
| 2,479,879 | Teter | Aug. 23, 1949 |

OTHER REFERENCES

Taylor et al.: J. Am. Chem. Soc., vol. 61, pp. 503–509 (1939).